United States Patent Office 3,485,814
Patented Dec. 23, 1969

3,485,814
DISAZO SULFONIC ACID DYES
Stanley Brooke Speck, Wilmington, Del., assignor to E. I. du Pont de Nemours and Company, Wilmington, Del., a corporation of Delaware
No Drawing. Continuation-in-part of application Ser. No. 479,310, Aug. 12, 1965. This application Dec. 17, 1965, Ser. No. 514,673
Int. Cl. C09b 31/12
U.S. Cl. 260—186                                4 Claims

ABSTRACT OF THE DISCLOSURE

4 - [(p - hydroxyphenyl)azo]azobenzene - sulfonic acid dyes, and derivatives thereof, useful for coloring polyamide fibers.

CROSS REFERENCES TO RELATED APPLICATIONS

This application is a continuation-in-part of copending application Ser. No. 479,310, filed Aug. 12, 1965 and abandoned March 10, 1967.

SUMMARY OF THE INVENTION

This invention is directed to novel disazo yellow to orange acid dyes having significant utility in the dyeing of polyamide fibers, particularly nylon carpet, in level shades having good lightfastness and chemical fastness. By chemical fastness is meant, principally, fastness against atmospheric contaminants such as nitrogen oxides and ozone, especially under conditions of high humidity.

It is an object of this invention to provide novel dyes that exhibit excellent exhaust and transfer properties at pH values as high as 6 to 7, and also to provide dyeings which exhibit shade stability against pH changes between about 3 and 7.

These and other objects of the invention will be apparent from the following description and claims.

BACKGROUND OF THE INVENTION

The relation of atmospheric contaminants to lightfastness of dyes on various fibers including nylon is discussed by Victor S. Salvin in the American Dyestuff Reporter 53, 33–41 (January 1964).

The problem of finding dyes suitable for dyeing nylon carpet is discussed by W. Grether in Fachorgan für Textilverdlung (SVF) 18: 361–368 No. 6 (1963). Grether reports that selected acid dyes and 2:1 metal complex dyes were tried in an effort to dye nylon carpet in level shades, but streak-free and level dyeings could only be attained with selected disperse dyes. It was also considered to be important to use disperse dyes because they have good affinity for nylon in alkaline dyebaths, e.g. in the range of pH 8.5–10. Dyeing at this pH is reported to be an advantage because of less staining by the jute backing of the nylon tufted carpet. Soiling by jute is known to be quite severe in dyebaths which are highly acidic. Disperse dyes, however, generally exhibit poor chemical fastness.

The impurities in jute are harmful in the dyeing of nylon for several reasons: (1) They are sources of stain on nylon, and the stain has poor lightfastness, (2) for unknown reasons these impurities have a profound harmful effect on the lightfastness of compound shades made from a variety of dyes—even beyond the fading of the impurities, and (3) sometimes these impurities interact with dyes to impair dye mobility, transfer, and hence the levelness of dyeing.

The problem of achieving levelness with acid dyes on nylon is a complicated one. Normally, one is required to seek a combination of: (1) the best level-dyeing acid dyes available, and (2) a leveling agent which levels the dye without being harmful in other aspects such as lightfastness. After finding such a combination, it frequently happens that the so-called level dyeing acid dyes must be rejected because they fail to exhaust well at the desired higher pH values. Acid dyes are normally applied at pH values down to 3.

DETAILED DESCRIPTION OF THE INVENTION

It has been found that a dramatic reduction in the harmful jute staining can be achieved when jute-backed nylon carpet is dyed at a pH as low as 6.0. It has also been found that the novel dyes of the present invention afford level dyeings when applied to jute-backed nylon carpet in the presence of selected leveling agents (see Example 4), which dyeings exhibit good lightfastness and chemical fastness. Furthermore, in contrast with most prior art acid dyes for nylon, such novel dyes exhaust well from the dyebath at higher pH values such as 6 to 6.5.

More specifically, the present invention is directed to yellow to orange dyes of the structure

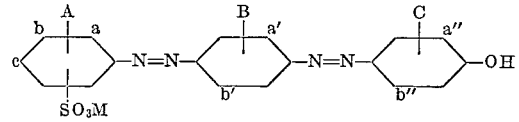

wherein:

$A = H$ or $CCH_3$ in position $a$, $b$ or $c$;
SOM is located ortho, meta or para to the azo group,
$M = H$, alkali metal or ammonium radical;
$B = H$, $CH_3$ or $C_{1-2}$ alkoxy located in position $a'$;
$B = H$, $CH_3$ or $C_{1-2}$ alkoxy located in position $b'$;
$C = H$, Cl or $C_{1-4}$ alkyl in position $a''$;
$C = H$ or $CH_3$ in position $b''$.

Preferred embodiments include said dye structure wherein $SO_3Na$ is meta to the azo group and $$A = B = C = H$$

said dye structure wherein $SO_3Na$ is para to the azo group and $A = B = C = H$; and said dye structure wherein $SO_3Na$ is meta to the azo group, A is H, B is the $OCH_3$ group in position $a'$, and C is the $CH_3$ group in position $a''$.

The present invention also relates to the process of manufacturing a dye as heretofore defined wherein the moieties labeled A, B and C are assembled by coupling A→B, then coupling AB→C, and, in the case where moiety A does not contain a sulfo group at the start, a sulfo group is introduced following either the first or second coupling, also an equivalent arylamine for coupler moiety B may be the appropriate aniline or aniline derivative in which the amino group carries a sulfo methyl radical —$CH_2$—$SO_3H$. Also, this invention relates to the dyeing of polyamide fibers from a hot, aqueous medium at a pH of 6 to 6.5 with a dye as heretofore defined; and to polyamide fibers dyed with such a dye.

The following examples are representative and illustrate the present invention and the utility thereof. The scope of this invention is not intended to be limited by these examples.

Example 1

227 parts of sodium metanilate are diazotized at 0° to 5° C. in known manner, and the resulting diazo solution is coupled by pouring it into a solution consisting of 220 parts of anilinomethanesulfonic acid, 100 parts of sodium bicarbonate and 1150 parts of water while holding the temperature below 5° C. After stirring the coupling mass for 2 hours, 234 parts of sodium hydroxide are added and the solution is heated at 90° C. for 45 minutes in order to hydrolyze the sulfomethyl group and form the free amino derivative. The solution is cooled to 80° C. and sodium chloride is added to provide a 12 to 15% NaCl concentration. After filtering, washing with 10% sodium chloride solution, and drying, a good yield of the sodium salt of m-(p-aminophenylazo)benzenesulfonic acid is obtained.

143 parts of the above intermediate are dissolved in 600 parts of water by warming, and 150 parts of concentrated hydrochloric acid are added with good stirring. After adding 600 parts of ice, 90 parts of 5 N sodium nitrite are added in three portions at 10° to 15° C. When diazotization is complete, the excess nitrite is destroyed by addition of sulfamic acid. The diazo thus prepared is coupled at 10° C. to phenol by pouring the diazo preparation into a solution containing 40 parts of phenol, 1150 parts of water, 15 parts of sodium hydroxide, 100 parts of sodium carbonate and 250 parts of ice. After stirring the coupling mass for 2 hours, the acid dye is filtered off, washed and dried. It has the structure

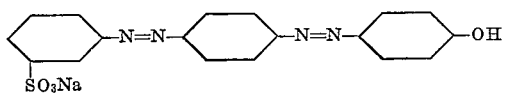

The visible spectrum of this dye in water solution gives a λ max. of 375 millimicrons and its molar extinction coefficient is 33,330. When applied to bulked continuous filament (BCF) nylon carpet yarn in the manner described in Example 4, one obtains a level, reddish-yellow shade which possesses excellent fastness properties.

Similar dyes are obtained when the metanilic acid component used in the present example is replaced by an equal molar amount of other aminoarylsulfonic acids such as; sulfanilic acid, orthanilic acid, 4-amino-o-toluenesulfonic acid [$SO_3H=1$], 4-amino-m-toluenesulfonic acid [$SO_3H=1$], 2 - amino - p - toluenesulfonic acid [$SO_3H=1$], or 6 - amino - m - toluenesulfonic acid [$SO_3H=1$].

Likewise, other dyes of similar properties are obtained by replacing the phenol employed in the present example with other phenols such as m-cresol, o-cresol, o-chlorophenol, 2,5-dimethylphenol, 6-chloro-m-cresol [$OH=1$], 6-butyl-m-cresol [$OH=1$], o-ethylphenol, o-propylphenol, or o-tert-butylphenol.

Example 2

115 parts of sodium metanilate are diazotized at 0° to 5° C. in known manner and the resulting diazo solution is coupled to 6-methyl-m-anisidine [$NH_2=1$] by pouring into a solution of 75 parts of the later in 1000 parts of water containing 150 parts of concentrated hydrochloric acid while holding the temperature below 5° C. After the coupling is complete, the reaction mixture is salted to 5% sodium chloride and the dye intermediate is isolated by filtering, washing with 10% sodium chloride solution, and drying.

The aminoazo intermediate thus prepared is diazotized and coupled to phenol in the manner described in Example 1. The resulting orange-yellow dye has the structure

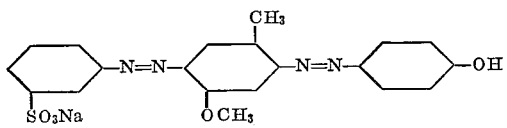

When applied to BCF nylon carpet yarn in the manner described in Example 4, level, reddish-yellow shades are obtained having excellent lightfastness.

Similar dyes are prepared by using in the present example other aminoarylsulfonic acids such as those mentioned in Example 1 and also by coupling said amino acids to other substituted anilines such as 2,5-dimethylaniline, o-anisidine, m-anisidine, m-toluidine, o-toluidine, 3-ethoxyaniline, 2,5-dimethoxyaniline, 5-methyl-o-anisidine [$NH_2=1$], or 2,5-diethoxyaniline.

Likewise, other dyes of similar properties are obtained by replacing the phenol used in the present example with substituted phenols such as those mentioned in Example 1.

Example 3

420 parts of sodium salt of m-(4-amino-3-methoxyphenylazo)benzenesulfonic acid are dissolved in 2000 parts of water by warming and agitation. 600 parts of concentrated hydrochloric acid are added and the solution is cooled to 0°–5° C. A solution of 71 parts of sodium nitrite in 200 parts of water is added. When diazotization is complete the excess nitrite is destroyed by addition of sulfamic acid. The diazo thus prepared is coupled at 10° C. to o-cresol by pouring the diazo preparation into a solution containing 130 parts of o-cresol, 5000 parts of water, 40 parts of sodium hydroxide, and 240 parts of sodium carbonate. After stirring the coupling mass for one hour, the mixture is salted to 6–8% sodium chloride by weight, and the dye is filtered off, washed, and dried. It has the structure:

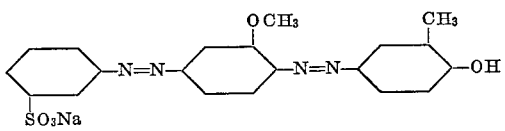

The visible spectrum of this dye in water solution gives a λ max. of 400 millimicrons and its molar extinction coefficient is 19,650. When applied to bulked continuous filament (BCF) nylon carpet yarn in the manner described in Example 5, a level, orange shade which possesses excellent fastness properties is obtained.

Similar dyes are obtained when: (1) the metanilic acid moiety used in the amino-azo diazo component of the present example is replaced (using the conventional diazotization and coupling procedure) by other aminoarylsulfonic acids such as: sulfanilic acid, orthanilic acid, 4-amino-o-toluenesulfonic acid [$SO_3H=1$], 4-amino-m-toluenesulfonic acid [$SO_3H=1$], 2-amino-p-toluenesulfonic acid [$SO_3H=$], or 6-amino-m-toluenesulfonic acid [$SO_3H=1$], and (2) the resulting amino-azo compounds are diazotized and coupled, as in the present example to o-cresol.

Similar dyes are prepared according to the present example except that the amino-azo diazo component employed is prepared by diazotizing any of the above mentioned aminoarylsulfonic acids followed by coupling to substituted anilines such as 2,5-dimethylaniline, o-anisidine, m-anisidine, o-toluidine, m-toluidine, 3-ethoxyaniline, 2,5-dimethoxyaniline, 5-methyl-o-anisidine [$NH_2=1$], or 2,5-diethoxyaniline.

Likewise, other dyes of similar properties are prepared according to the procedure of this example when the amino-azo diazo components prepared according to the previous paragraph are diazotized and coupled to the following phenolic compounds: phenol, o-cresol, m-cresol, o-chlorophenol, 2,5-dimethylphenol, 6-chloro-m-cresol [$OH=1$], 6-butyl - m - cresol [$OH=1$], o-ethylphenol, o-propylphenol, or o-tert-butylphenol.

Example 4.—Variations in process (a) As an alternative route to the dye $$NaO_3S-\langle\rangle-N=N-\langle\rangle-N=N-\langle\rangle-OH$$

ten parts of p-phenylazoaniline are sulfonated by warming at 50° C. with 40 parts of 100% sulfuric acid for two hours. The resulting p-(p-aminophenylazo)benzenesulfonic acid is isolated by pouring the sulfonation mass over ice and filtering. The resulting product is then diazotized and coupled to phenol as described in Example 1. The resulting dye is similar in properties to the dye described in that example.

(b) Still another route to the sulfonated disazo dye is by direct sulfonation of the disazo compound,

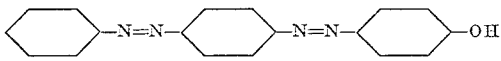

Twenty parts of said disazo compound are added to a mixture of 180 parts of 100% sulfuric acid and 40 parts of 20% oleum (a solution of $SO_3$ in $H_2SO_4$ which solution contains 20% by weight of $SO_3$). The resulting solution is warmed at 60° to 70° C. for about an hour when sulfonation is essentially complete. The mixture is poured over ice, then filtered. The collected solid is slurried in water and the slurry is made alkaline (pH 9.0–9.5) by addition of sodium hydroxide. The insoluble dye is collected on a filter and washed with water.

Example 5.—Dyeing nylon carpeting

The carpeting is made by tufting nylon yarn onto a jute backing. The BCF nylon yarn used for this is 3700-denier, 204-continuous filaments, trilobal, jet-bulked yarn, melt-spun from poly(hexamethylene adipamide) flake. The yarn is jet-bulked with the jet taught by Hallden et al. in U.S. Patent 3,005,251.

Thirty parts of said carpeting are installed in dye-bath equipment. First, it is helpful to scour the carpet at 180° F. (82° C.) for 20–30 minutes in a bath made up of 1000 parts water, 0.2 part of a nonionic surfactant (the condensation product of 20 moles of ethylene oxide with one mole of $C_{18}$ alcohol), 0.6 part concentrated ammonium hydroxide and 0.15 part sodium hydroxide. The bath is dropped and the carpet is rinsed with clean water. A dyebath is then made up of 1000 parts water, 0.3 part of dodecyldiphenyl ether disulfonic acid, disodium salt (U.S. 2,081,876), 0.03 part of the acid dye of Example 1 and 0.6 part of monosodium phosphate. The pH is adjusted to 6.0 by addition of acetic acid or disodium phosphate (whichever is necessary). The bath temperature is raised to 210° F. (99° C.) over 45 minutes and the dying is continued for one hour. The bath is dropped and the carpet is given a warm water rinse.

When the pH of the dyebath is adjusted to 6.5, instead of 6.0 as in the present example, similar results are obtained.

Any of the dyes of the present invention may be applied in this manner to give yellow to orange shades having excellent levelness and lightfastness.

In lieu of the leveling agent used in this example, others disclosed in U.S. Patents 2,081,876 and 2,854,477, may be employed.

Wool and silk may also be dyed in fast yellow to orange shades by the process of this example.

The acid dyes prepared according to the examples are shown in the form of their sodium sulfonates. It will be understood that the dyes of this invention may also be prepared and used in their free acid form or as their alkali metal or ammonium salts. For instance, in Example 1 the NaOH, NaCl, and $Na_2CO_3$ may be replaced by chemical equivalent amounts of KOH, KCl and $K_2CO_3$, respectively, to provide the potassium sulfonate form of the dye. Similarly, the lithium sulfonate of the dyes may be prepared.

In order to obtain the dyes in the form of their free acids an aqueous slurry of the dye is made strongly acid with hydrochloric acid and then warmed with stirring. The insoluble acid form of the dye is then filtered off and washed with warm water.

The ammonium salts of the dyes may be obtained by dissolving their free sulfonic acids in aqueous ammonium hydroxide followed by salting out their ammonium sulfonates with ammonium chloride or ammonium sulfate.

The preceding representative examples may be varied within the scope of the present total specification disclosure, as understood and practiced by one skilled in the art, to achieve essentially the same results.

The emodiments of the invention in which an exclusive property or privilege is claimed are as follows:

1. a dye of the structure

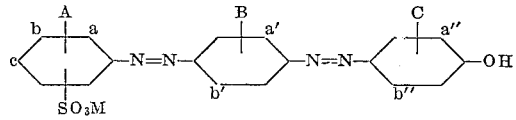

wherein:
A=H or $CH_3$ in position $a$, $b$ or $c$;
$SO_3M$ is located ortho, meta or para to the azo group
M=H, lithium, sodium, potassium or ammonium radical;
B=H, $CH_3$ or $C_{1-2}$ alkoxy located in position $a'$;
B=H, $CH_3$ of $C_{1-2}$ alkoxy located in position $b'$;
C=H, Cl or $C_{1-4}$ alkyl in position $a''$; and
C=H or $CH_3$ in position $b''$.

2. A dye according to claim 1 wherein $SO_3Na$ is meta to the azo group and A=B=C=H.

3. A dye according to claim 1 wherein $SO_3Na$ is para to the azo group and A=B=C=H.

4. A dye according to claim 1 wherein $SO_3Na$ is meta to the azo group, A is H, B is $OCH_3$ in position $a'$, and C is $CH_3$ in position $a''$.

References Cited

FOREIGN PATENTS 1,201,549    7/1959    France.
1,365,903    5/1964    France.

CHARLES B. PARKER, Primary Examiner

D. M. PAPUGA, Assistant Examiner

U.S. Cl. X.R.

8—41, 55, 54; 260—184, 205

Disclaimer 3,485,814.—*Stanley Brooke Speck*, Wilmington, Del. DISAZO SULFONIC ACID DYES. Patent dated Dec. 23, 1969. Disclaimer filed Dec. 9, 1971 by the assignee, *E. I. du Pont de Nemours and Company*.

Hereby enters this disclaimer to claims 1, 2 and 3 of said patent.

[*Official Gazette March 7, 1972.*]